US009489509B2

(12) United States Patent
Chung

(10) Patent No.: US 9,489,509 B2
(45) Date of Patent: Nov. 8, 2016

(54) ELECTRONIC DEVICE AND METHOD FOR UNLOCKING OBJECTS OF ELECTRONIC DEVICE

(71) Applicant: Chiun Mai Communication Systems, Inc., New Taipei (TW)

(72) Inventor: Yu-An Chung, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 73 days.

(21) Appl. No.: 14/464,926

(22) Filed: Aug. 21, 2014

(65) Prior Publication Data

US 2015/0058915 A1 Feb. 26, 2015

(30) Foreign Application Priority Data

Aug. 22, 2013 (CN) .......................... 2013 1 0368054

(51) Int. Cl.

| | |
|---|---|
| ***H04L 9/32*** | (2006.01) |
| ***G06F 21/45*** | (2013.01) |
| ***G06F 3/0481*** | (2013.01) |
| ***G06F 3/0488*** | (2013.01) |
| ***G06F 21/31*** | (2013.01) |

(52) U.S. Cl.

CPC ............. *G06F 21/45* (2013.01); *G06F 3/0481* (2013.01); *G06F 3/0488* (2013.01); *G06F 21/31* (2013.01)

(58) Field of Classification Search

CPC ........ G06F 21/10; G06F 21/12; G06F 21/44; G06F 21/45; G06F 21/121; G06F 21/31; G06F 21/36

USPC .................................. 726/26–30, 2; 713/193

See application file for complete search history.

(56) References Cited

U.S. PATENT DOCUMENTS

| | | | | |
|---|---|---|---|---|
| 8,564,544 | B2 * | 10/2013 | Jobs | G06F 3/0488 345/173 |
| 8,627,096 | B2 * | 1/2014 | Azar | G06F 21/32 713/186 |
| 8,674,966 | B2 * | 3/2014 | Jansson | G06F 3/042 345/169 |
| 2008/0310602 | A1 * | 12/2008 | Bhupati | H04M 1/2478 379/88.12 |

* cited by examiner

*Primary Examiner* — Hosuk Song

(74) *Attorney, Agent, or Firm* — Zhigang Ma

(57) ABSTRACT

In a method for unlocking an object of an electronic device, an unlocking rule is preset to unlock the object. After movement signals are received from a touch screen of the electronic device, a quantity of segments displayed on the touch screen generated by the movement signals and a quantity of areas of the touch screen partitioned by the obtained segments are obtained. When a touch signal on one area of the obtained areas is received, a sequence number of the area from which the touch signal is received is calculated. The object of the electronic device is unlocked when the object is authorized to be unlocked according to the preset unlocking rule, the quantity of the obtained segments, the quantity of the obtained areas, and the sequence number of the area from which the touch signal is received.

20 Claims, 4 Drawing Sheets

ELECTRONIC DEVICE AND METHOD FOR UNLOCKING OBJECTS OF ELECTRONIC DEVICE

CROSS-REFERENCE TO RELATED APPLICATIONS

This application claims priority to Chinese Patent Application No. 201310368054.9 filed on Aug. 22, 2013, the contents of which are incorporated by reference herein.

FIELD

Embodiments of the present disclosure relate to electronic device unlocking technology.

BACKGROUND

A touch screen of an electronic device can be unlocked by a variety of unlocking mechanisms, including entering a password or sliding fingers in a specific pattern across the touch screen. However, there is a possibility that the unlocking mechanisms can be remembered by other people who see fingers movement on the touch screen.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
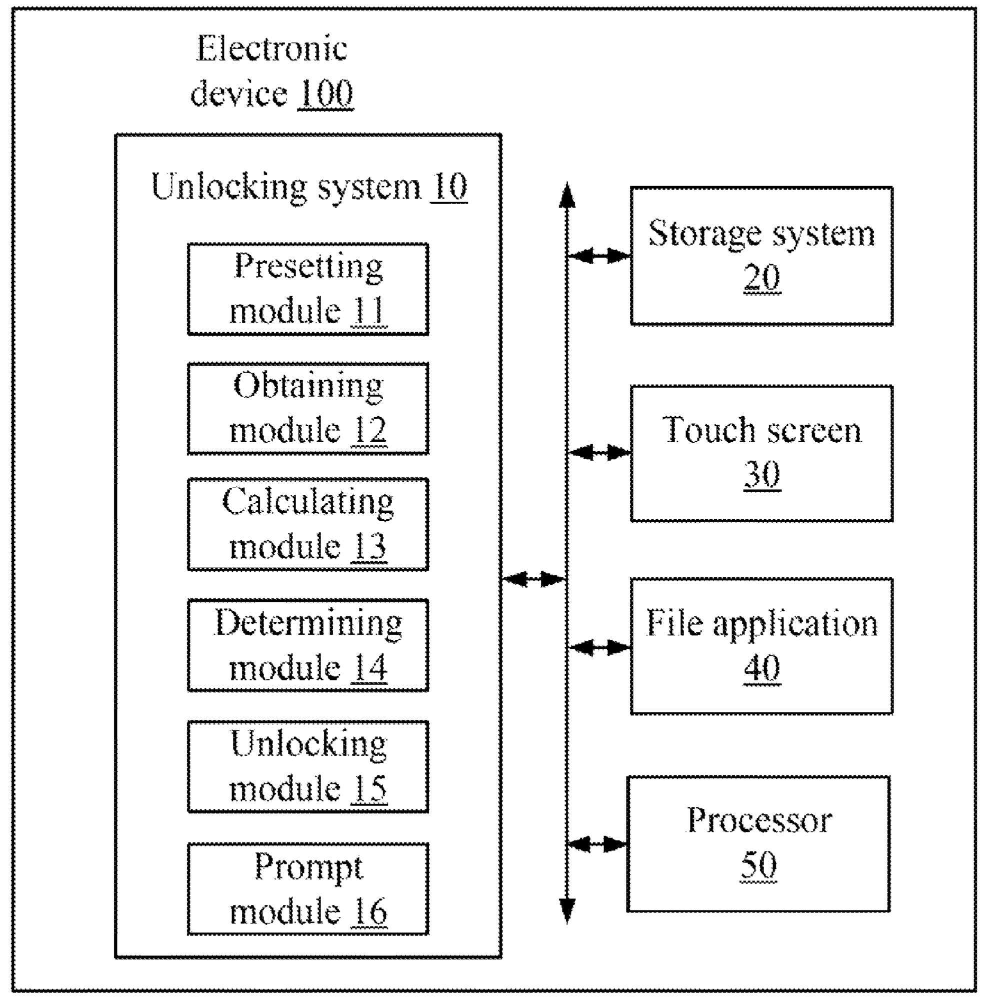
FIG. 1 is a block diagram of one embodiment of an electronic device including an unlocking system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 illustrates a block diagram of one embodiment of an electronic device 100. Depending on the embodiment, the electronic device 100 includes an unlocking system 10. In one embodiment, the electronic device 100 can be a tablet computer, a notebook computer, a personal digital assistant, a mobile phone, or any other electronic device which has a touch screen 30. The touch screen 30 can recognize touches of a finger (hereinafter abbreviated as "finger touches") of a user, and transmit touch signals accordingly. The touch screen 30 also can recognize movements of the finger (hereinafter abbreviated as "finger movements"), and transmit movement signals accordingly. Each movement signal is recognized in one or more segments of the touch screen 30. When each movement signal corresponds to one segment of the touch screen 30, the beginning point of the segment is on an edge of the touch screen 30, and the end point of the segment is on one of other edges of the touch screen 30.

The electronic device 100 further includes, but is not limited to, a storage system 20, a file application 40, and at least one processor 50. The file application 40 can be, but is not limited to being, a file or a folder in the electronic device 100.

In at least one embodiment, the storage system 20 can include various types of non-transitory computer-readable storage media. For example, the storage system 20 can be an internal storage system, such as a flash memory, a random access memory (RAM) for temporary storage of information, and/or a read-only memory (ROM) for permanent storage of information. The storage system 20 can also be an external storage system, such as a hard disk, a storage card, or a data storage medium. The at least one processor 50 can be a central processing unit (CPU), a microprocessor, or other data processor chip that performs functions of the electronic device 100.

In at least one embodiment, the unlocking system 10 can include a presetting module 11, an obtaining module 12, a calculating module 13, a determining module 14, an unlocking module 15, and a prompt module 16. The function modules 11-16 can include computerized code in the form of one or more programs, which are stored in the storage system 20. The at least one processor executes the computerized code to provide functions of the function modules 11-16.

The presetting module 11 is configured to preset an unlocking rule for unlocking an object of the electronic device 100. The object of the electronic device 100 can be the touch screen 30 or can be the file application 40 displayed on the touch screen 30. In the embodiment, the unlocking rule comprises a quantity of preset segments displayed on the touch screen 30, a quantity of preset areas of the touch screen 30 partitioned by the preset segments, and a sequence number of an unlocking area for unlocking the object in the preset areas. The sequence number of the unlocking area is a sequence number of the size of the unlocking area in sizes of the preset areas when the sizes of the preset areas are sorted in an ascending order or in a descending order.

Figure 3:
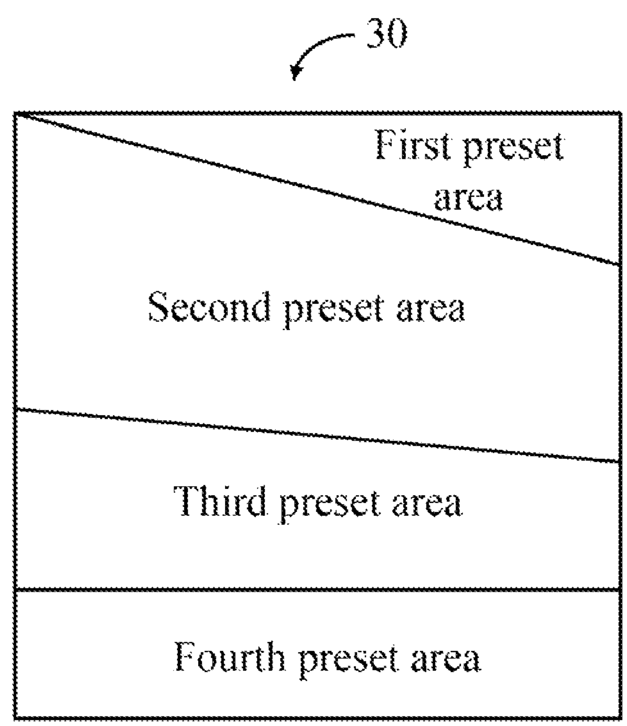
FIG. 3 is a diagrammatic view of one embodiment of presetting an unlocking rule on a touch screen of the electronic device in FIG. 1.

A detailed description of presetting the unlocking rule is as follows. First, a prompt is generated to input a plurality of finger movements on the touch screen 30. Second, after the movement signals corresponding to the finger movements are received by the touch screen 30, a quantity of the preset segments generated by the movement signals and a quantity of the preset areas of the touch screen 30 partitioned by the preset segments are obtained. In FIG. 3 for example, the touch screen 30 is partitioned to four preset areas by three preset segments, and the four preset areas are respectively named as a first preset area, a second preset area, a third preset area, and a fourth preset area. Third, a prompt is generated to input a finger touch on the touch screen 30. The finger touch selects the unlocking area in the preset areas for unlocking the object. Fourth, after a touch signal corresponding to the finger touch is received by the touch screen 30, a sequence number of the unlocking area in the preset areas is obtained. In the example shown in FIG. 3, when sizes of the four preset areas are sorted in a descending order and the second preset area is selected, a sequence number of the second preset area is one. Fifth, the quantity of the preset segments, the quantity of the preset areas, and the sequence number of the unlocking area are stored as the preset rule, to the storage system 20.

In other embodiments, the unlocking rule can be predetermined by a manufacturer of the electronic device 100. That is, presetting the unlocking rule as mentioned above can be preset as a default function.

When the object of the electronic device 100 needs to be unlocked, the obtaining module 12 is configured to receive a plurality of movement signals from the touch screen 30 when one or more finger movements are applied to the touch screen 30. The obtaining module 12 further obtains a quantity of segments displayed on the touch screen 30 generated by the movement signals, and obtains a quantity of areas of the touch screen 30 partitioned by the obtained segments. In the example shown in FIG. 4, the touch screen 30 is partitioned to four obtained areas by the three obtained segments, and the four obtained areas are respectively named as a first obtained area, a second obtained area, a third obtained area, and a fourth obtained area.

The calculating module 13 is configured to receive a touch signal on the touch screen 30 from one area of the obtained areas when a finger touch is applied to the area from which the touch signal is received, and calculate a sequence number of the area from which the touch signal is received. The sequence number of the area from which the touch signal is received is a sequence number of the size of the area from which the touch signal is received in sizes of the obtained areas when the sizes of the obtained areas are sorted in an ascending order or in a descending order. In the example shown in FIG. 4, when sizes of the four obtained areas are sorted in a descending order, a sequence number of the third obtained area is one, and a sequence number of the first obtained area is two.

The determining module 14 is configured to determine whether the object is authorized to be unlocked according to the unlocking rule, the quantity of the obtained segments, the quantity of the obtained areas, and the sequence number of the area from which the touch signal is received.

Figure 4:
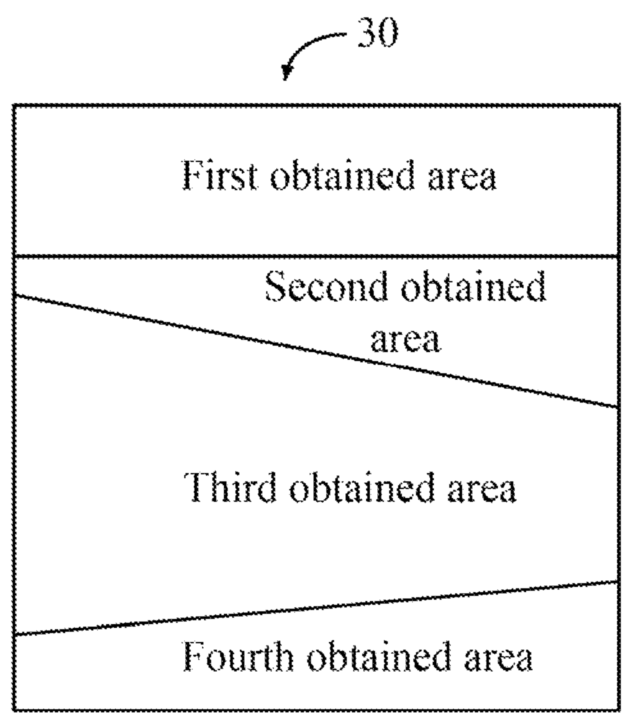
FIG. 4 is a diagrammatic view of one embodiment of unlocking an object of the electronic device on a touch screen of the electronic device in FIG. 1.

In one embodiment, the determining module 14 determines that the object is authorized to be unlocked when the quantity of the obtained segments is equal to the quantity of the preset segments, the quantity of the obtained areas is equal to the quantity of the preset areas, and the sequence number of the area from which the touch signal is received is equal to the sequence number of the unlocking area. For example, as shown in FIG. 4, the quantity of the obtained segments denoted as three is equal to the quantity of the preset segments shown in FIG. 3, and the quantity of the obtained areas denoted as four is equal to the quantity of the preset areas shown in FIG. 3. When the third obtained area in FIG. 4 is selected as the area from which the touch signal is received, the sequence number of the third obtained area denoted as one is equal to the sequence number of the unlocking area shown in FIG. 3, and then the determining module 14 determines that the object is authorized to be unlocked.

In one embodiment, the determining module 14 determines that the object is not authorized to be unlocked when the quantity of the obtained segments is not equal to the quantity of the preset segments, or the quantity of the obtained areas is not equal to the quantity of the preset areas, or the sequence number of the area from which the touch signal is received is not equal to the sequence number of the unlocking area. When the first obtained area in FIG. 4 is selected as the area from which the touch signal is received, the sequence number of the first obtained area denoted as two is not equal to the sequence number of the unlocking area shown in FIG. 3, and in that case the determining module 14 determines that the object is not authorized to be unlocked.

When a determination is made that the object is authorized to be unlocked, the unlocking module 15 is configured to unlock the object of the electronic device 100.

When a determination is made that the object is not authorized to be unlocked, the prompt module 16 is configured to generate a prompt to the user that unlocking of the object of the electronic device 100 is not authorized.

Figure 2:
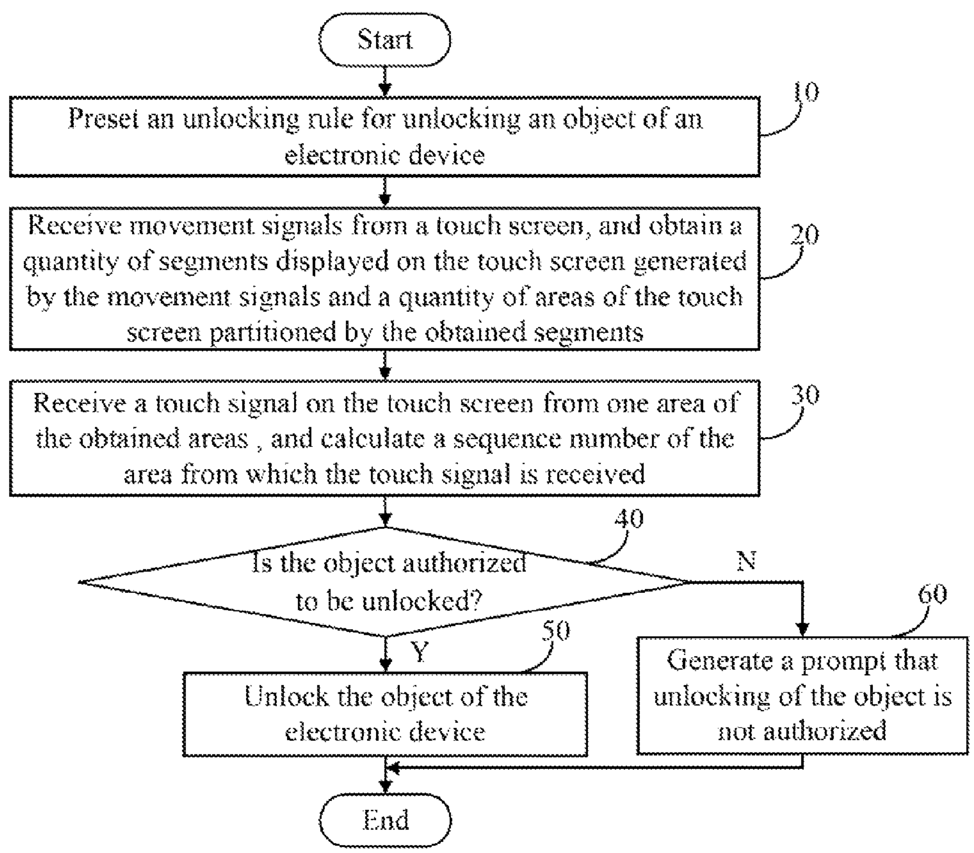
FIG. 2 illustrates a flowchart of one embodiment of a method for unlocking an object of the electronic device in FIG. 1.

Referring to FIG. 2, a flowchart is presented in accordance with an example embodiment. The example method is provided by way of example, as there are a variety of ways to carry out the method. The method described below can be carried out using the configurations illustrated in FIG. 1, for example, and various elements of these figures are referenced in explaining example method. Each block shown in FIG. 2 represents one or more processes, methods, or subroutines, carried out in the exemplary method. Additionally, the illustrated order of blocks is by example only and the order of the blocks can be changed. The exemplary method can begin at block 10. Depending on the embodiment, additional blocks can be added, others removed, and the ordering of the blocks can be changed.

In block 10, a presetting module presets an unlocking rule for unlocking an object of an electronic device. The object can be a touch screen of the electronic device or can be a file application on the touch screen.

In block 20, an obtaining module receives a plurality of movement signals from the touch screen when one or more finger movements are applied to the touch screen, and obtains a quantity of segments displayed on the touch screen generated by the movement signals and a quantity of areas of the touch screen partitioned by the obtained segments.

In block 30, a calculating module receives a touch signal on the touch screen from one area of the obtained areas when a finger touch is applied to the area from which the touch signal is received, and calculates a sequence number of the area from which the touch signal is received. The sequence number of the area from which the touch signal is received is a sequence number of the size of the area from which the touch signal is received in sizes of the obtained areas when the sizes of the obtained areas are sorted in an ascending order or in a descending order.

In block 40, a determining module determines whether the object is authorized to be unlocked according to the unlocking rule, the quantity of the obtained segments, the quantity of the obtained areas, and the sequence number of the area from which the touch signal is received. When the object is authorized to be unlocked, block 50 is executed. When the object is not authorized to be unlocked, block 60 is executed.

In one embodiment, the determining module determines that the object is authorized to be unlocked when the quantity of the obtained segments is equal to the quantity of the preset segments, the quantity of the obtained areas is equal to the quantity of the preset areas, and the sequence number of the area from which the touch signal is received is equal to the sequence number of the unlocking area. The determining module determines that the object is not authorized to be unlocked when the quantity of the obtained segments is not equal to the quantity of the preset segments, or the quantity of the obtained areas is not equal to the quantity of the preset areas, or the sequence number of the area from which the touch signal is received is not equal to the sequence number of the unlocking area.

In block 50, an unlocking module unlocks the object of the electronic device.

In block 60, a prompt module generates a prompt to the user that unlocking of the object of the electronic device is not authorized.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A computer-implemented method for unlocking an object of an electronic device, the method comprising:

presetting an unlocking rule for unlocking the object;

receiving a plurality of movement signals from a touch screen of the electronic device;

obtaining a quantity of segments displayed on the touch screen generated by the plurality of movement signals and a quantity of areas of the touch screen partitioned by the obtained segments;

receiving a touch signal on the touch screen from one area of the obtained areas;

calculating, at a processor of the electronic device, a sequence number of the area from which the touch signal is received;

determining whether the object is authorized to be unlocked according to the preset unlocking rule, the quantity of the obtained segments, the quantity of the obtained areas, and the sequence number of the area from which the touch signal is received; and unlocking the object of the electronic device when the object is authorized to be unlocked.

2. The method according to claim 1, wherein the object is the touch screen or a file application on the touch screen of the electronic device.

3. The method according to claim 1, wherein the sequence number of the area from which the touch signal is received is a sequence number of the size of the area from which the touch signal is received in sizes of the obtained areas when the sizes of the obtained areas are sorted in an ascending order or in a descending order.

4. The method according to claim 1, wherein each of the movement signals corresponds to one or more segments, wherein when each of the movement signals corresponds to one segment, the beginning point of the segment is on an edge of the touch screen, and the end point of the segment is on one of other edges of the touch screen.

5. The method according to claim 1, wherein the unlocking rule comprises a quantity of preset segments displayed on a touch screen of the electronic device, a quantity of preset areas of the touch screen partitioned by the preset segments, and a sequence number of an unlocking area for unlocking the object in the preset areas.

6. The method according to claim 5, wherein the determination of whether the object is authorized to be unlocked comprises:

determining that the object is authorized to be unlocked when the quantity of the obtained segments is equal to the quantity of the preset segments, the quantity of the obtained areas is equal to the quantity of the preset areas, and the sequence number of the area from which the touch signal is received is equal to the sequence number of the unlocking area; and determining that the object is not authorized to be unlocked when the quantity of the obtained segments is not equal to the quantity of the preset segments, the quantity of the obtained areas is not equal to the quantity of the preset areas, or the sequence number of the area from which the touch signal is received is not equal to the sequence number of the unlocking area.

7. The method according to claim 1, wherein the unlocking rule is preset by:

generating a prompt configured to input a plurality of finger movements on the touch screen;

receiving movement signals corresponding to the plurality of the finger movements from the touch screen;

obtaining a quantity of preset segments generated by the movement signals and a quantity of preset areas of the touch screen partitioned by the preset segments;

generating a prompt configured to input a finger touch on the touch screen, wherein the finger touch selects an unlocking area in the preset areas for unlocking the object;

receiving a touch signal corresponding to the finger touch from the touch screen;

obtaining a sequence number of the unlocking area in the preset areas; and storing the quantity of the preset segments, the quantity of the preset areas, and the sequence number of the unlocking area as the preset rule to a storage system of the electronic device.

8. An electronic device for unlocking an object of an electronic device, the electronic device comprising:

a touch screen;

a processor; and a storage system that stores one or more programs, when executed by the at least one processor, cause the at least one processor to:

preset an unlocking rule for unlocking the object;

receive a plurality of movement signals from the touch screen;

obtain a quantity of segments displayed on the touch screen generated by the plurality of movement signals and a quantity of areas of the touch screen partitioned by the obtained segments;

receive a touch signal on the touch screen from one area of the obtained areas;

calculate a sequence number of the area from which the touch signal is received;

determine whether the object is authorized to be unlocked according to the preset unlocking rule, the quantity of the obtained segments, the quantity of the obtained areas, and the sequence number of the area from which the touch signal is received; and unlock the object of the electronic device when the object is authorized to be unlocked.

9. The electronic device according to claim 8, wherein the object is the touch screen or a file application on the touch screen of the electronic device.

10. The electronic device according to claim 8, wherein the sequence number of the area from which the touch signal is received is a sequence number of the size of the area from which the touch signal is received in sizes of the obtained areas when the sizes of the obtained areas are sorted in an ascending order or in a descending order.

11. The electronic device according to claim 8, wherein each of the movement signals corresponds to one or more segments, wherein when each of the movement signals corresponds to one segment, the beginning point of the segment is on an edge of the touch screen, and the end point of the segment is on one of other edges of the touch screen.

12. The electronic device according to claim 8, wherein the unlocking rule comprises a quantity of preset segments displayed on a touch screen of the electronic device, a quantity of preset areas of the touch screen partitioned by the preset segments, and a sequence number of an unlocking area for unlocking the object in the preset areas.

13. The electronic device according to claim 12, wherein the determination of whether the object is authorized to be unlocked comprises:

determining that the object is authorized to be unlocked when the quantity of the obtained segments is equal to the quantity of the preset segments, the quantity of the obtained areas is equal to the quantity of the preset areas, and the sequence number of the area from which the touch signal is received is equal to the sequence number of the unlocking area; and determining that the object is not authorized to be unlocked when the quantity of the obtained segments is not equal to the quantity of the preset segments, the quantity of the obtained areas is not equal to the quantity of the preset areas, or the sequence number of the area from which the touch signal is received is not equal to the sequence number of the unlocking area.

14. The electronic device according to claim 8, wherein the unlocking rule is preset by:

generating a prompt configured to input a plurality of finger movements on the touch screen;

receiving movement signals corresponding to the plurality of the finger movements from the touch screen;

obtaining a quantity of preset segments generated by the movement signals and a quantity of preset areas of the touch screen partitioned by the preset segments;

generating a prompt configured to input a finger touch on the touch screen, wherein the finger touch selects an unlocking area in the preset areas for unlocking the object;

receiving a touch signal corresponding to the finger touch from the touch screen;

obtaining a sequence number of the unlocking area in the preset areas; and storing the quantity of the preset segments, the quantity of the preset areas, and the sequence number of the unlocking area as the preset rule to the storage system.

15. A non-transitory storage medium having stored thereon instructions that, when executed by a processor of an electronic device, causes the processor to perform a method for unlocking an object of the electronic device, wherein the method comprises:

presetting an unlocking rule for unlocking the object;

receiving a plurality of movement signals from a touch screen of the electronic device;

obtaining a quantity of segments displayed on the touch screen generated by the plurality of movement signals and a quantity of areas of the touch screen partitioned by the obtained segments;

receiving a touch signal on the touch screen from one area of the obtained areas;

calculating a sequence number of the area from which the touch signal is received;

determining whether the object is authorized to be unlocked according to the preset unlocking rule, the quantity of the obtained segments, the quantity of the obtained areas, and the sequence number of the area from which the touch signal is received; and unlocking the object of the electronic device when the object is authorized to be unlocked.

16. The non-transitory storage medium according to claim 15, wherein the object is the touch screen or a file application on the touch screen of the electronic device.

17. The non-transitory storage medium according to claim 15, wherein each of the movement signals corresponds to one or more segments, wherein when each of the movement signals corresponds to one segment, the beginning point of the segment is on an edge of the touch screen, and the end point of the segment is on one of other edges of the touch screen.

18. The non-transitory storage medium according to claim 15, wherein the unlocking rule comprises a quantity of preset segments displayed on a touch screen of the electronic device, a quantity of preset areas of the touch screen partitioned by the preset segments, and a sequence number of an unlocking area for unlocking the object in the preset areas.

19. The non-transitory storage medium according to claim 18, wherein the determination of whether the object is authorized to be unlocked comprises:

determining that the object is authorized to be unlocked when the quantity of the obtained segments is equal to the quantity of the preset segments, the quantity of the obtained areas is equal to the quantity of the preset areas, and the sequence number of the area from which the touch signal is received is equal to the sequence number of the unlocking area; and determining that the object is not authorized to be unlocked when the quantity of the obtained segments is not equal to the quantity of the preset segments, the quantity of the obtained areas is not equal to the quantity of the preset areas, or the sequence number of the area from which the touch signal is received is not equal to the sequence number of the unlocking area.

20. The non-transitory storage medium according to claim 15, wherein the unlocking rule is preset by:

generating a prompt configured to input a plurality of finger movements on the touch screen;

receiving movement signals corresponding to the plurality of the finger movements from the touch screen;

obtaining a quantity of preset segments generated by the movement signals and a quantity of preset areas of the touch screen partitioned by the preset segments;

generating a prompt configured to input a finger touch on the touch screen, wherein the finger touch selects an unlocking area in the preset areas for unlocking the object;

receiving a touch signal corresponding to the finger touch from the touch screen;

obtaining a sequence number of the unlocking area in the preset areas; and storing the quantity of the preset segments, the quantity of the preset areas, and the sequence number of the unlocking area as the preset rule to a storage system of the electronic device.

* * * * *